(No Model.) 2 Sheets—Sheet 1.
J. W. DECASTRO & T. H. MÜLLER.
APPARATUS FOR SEPARATING BODIES OF DIFFERENT SPECIFIC GRAVITIES.
No. 273,037. Patented Feb. 27, 1883.
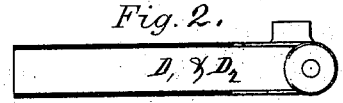
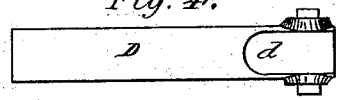
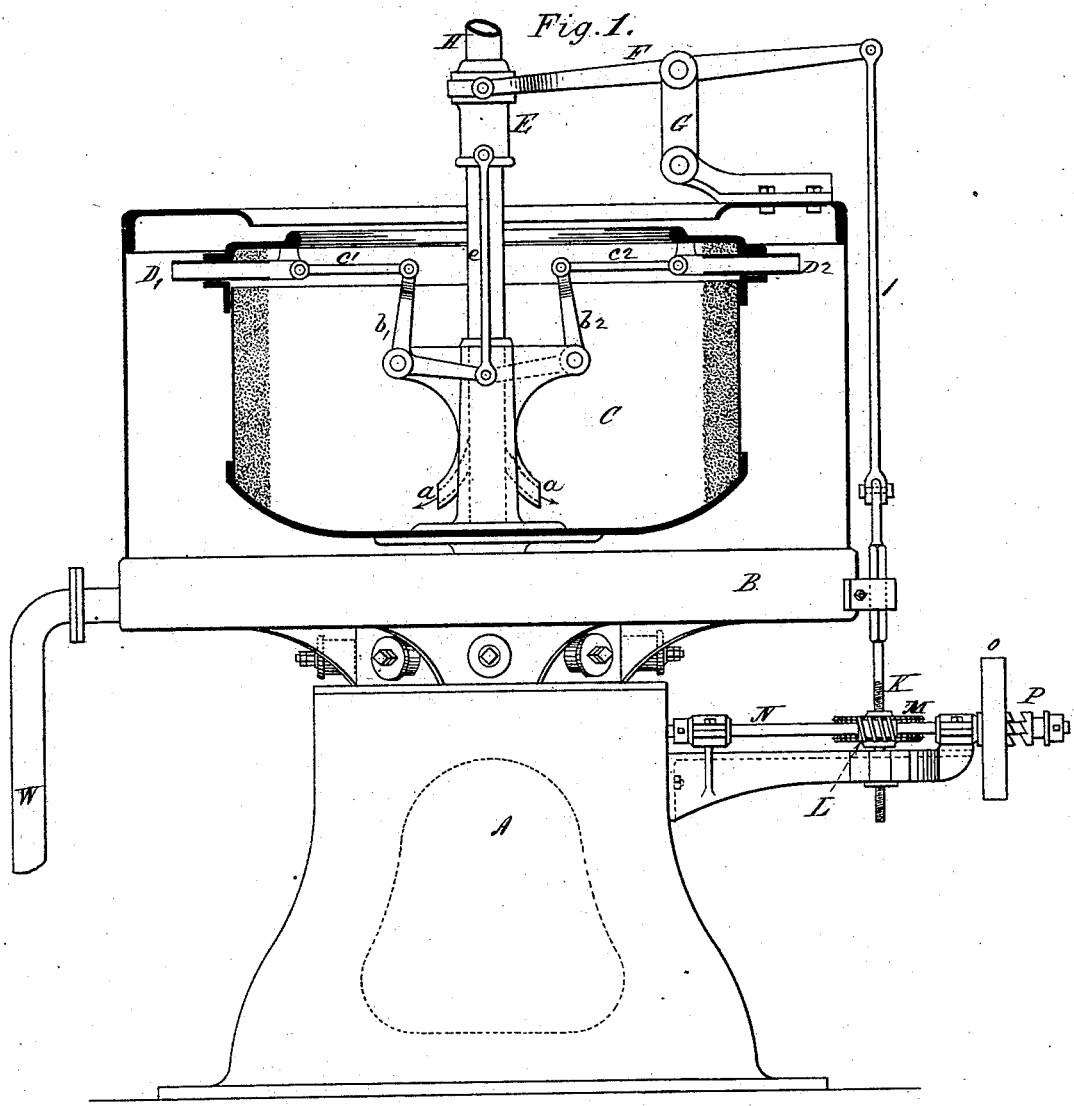

(No Model.) 2 Sheets—Sheet 2.
J. W. DECASTRO & T. H. MÜLLER.
APPARATUS FOR SEPARATING BODIES OF DIFFERENT SPECIFIC GRAVITIES.
No. 273,037. Patented Feb. 27, 1883.
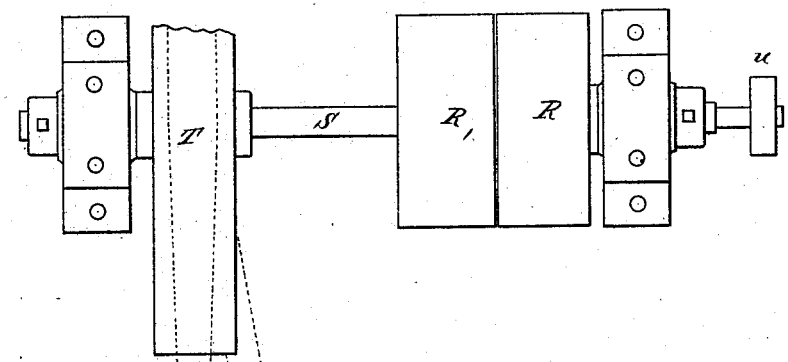
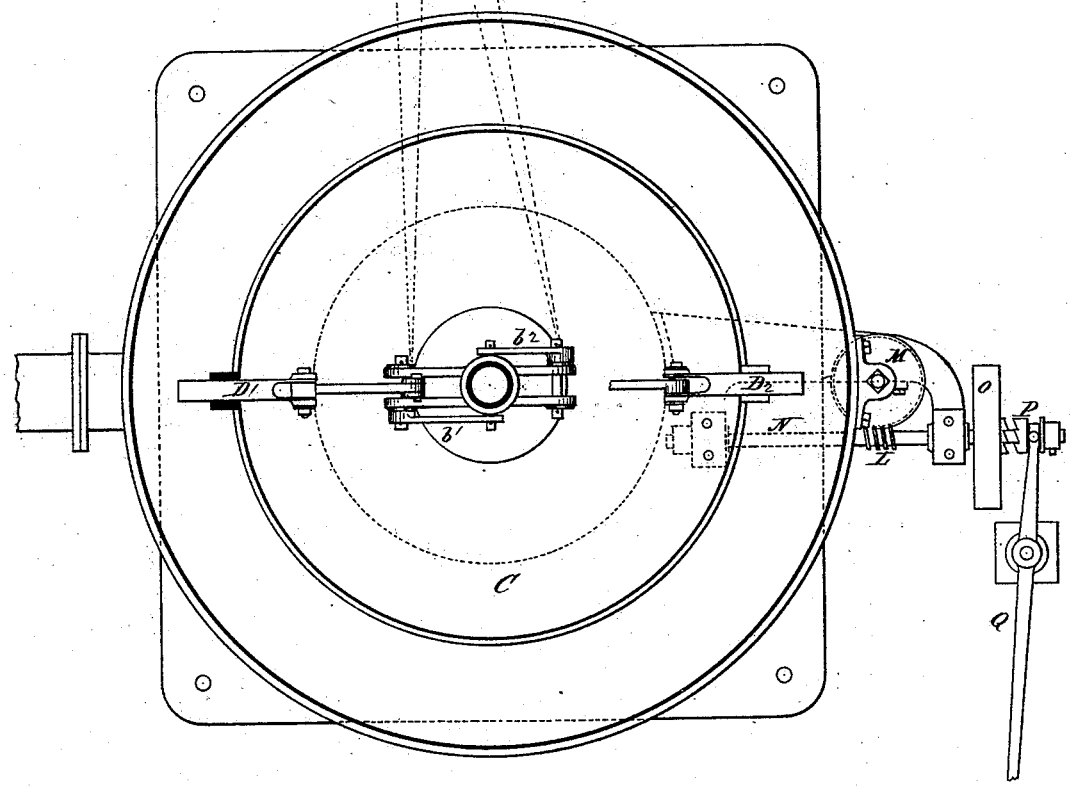
Fig. 5.

UNITED STATES PATENT OFFICE.

JACOB W. DECASTRO AND TEILE H. MÜLLER, OF NEW YORK, N. Y.

APPARATUS FOR SEPARATING BODIES OF DIFFERENT SPECIFIC GRAVITIES.

SPECIFICATION forming part of Letters Patent No. 273,037, dated February 27, 1883.

Application filed December 9, 1882. (No model.)

*To all whom it may concern:*

Be it known that we, JACOB W. DECASTRO and TEILE HENRY MÜLLER, of the city, county, and State of New York, have invented a new and useful Improvement in Apparatus for Separating Bodies of Different Specific Gravities, of which the following is a full, clear, and exact description, reference being had to the accompanying drawings.

Our invention relates to an improved apparatus for carrying out the process for which we made application on the 25th day of August, 1882, in machines for carrying out processes similar to the one there described, in which a gradual retreating overflow of the liquid is requisite, which shall, in the operation of the machine, retire gradually from the circumference toward the center.

In the apparatus described in said application there was described a pivoted overflow-pipe pivoted in the center of the apparatus. In our present apparatus the overflow passes directly through the basket itself.

Our apparatus will be readily understood from the accompanying drawings, in which—

Figure 1 represents a sectional view through our basket, showing the tube-driving mechanism; Fig. 2, a view of the discharge or overflow pipe; Fig. 3, an end view of the same; Fig. 4, a bottom view of the same; Fig. 5, a plan of the machine, showing the counter-shafts.

C represents the centrifugal basket, which may be of any suitable construction. The liquid to be introduced into this basket may be introduced through any suitable apparatus; but in the drawings shown it passes through the central tube, H, and then passes to the bottom of the basket through the pipe $a$ $a$. Two pipes, $D'$ $D^2$, project outwardly through the lateral openings through the periphery of the basket, in which they should fit reasonably tight. The position of the inner edge of these tubes determines the thickness of the material deposited within the basket. The motion of these tubes $D'$ $D^2$ is determined by the bell-crank levers $b'$ $b^2$, which are attached by links $e$ to a shifting collar, E. The position of this collar is determined by the lever F, supported on the fulcrum G. As the collar is raised it is evident that the inner edges of the tubes $D'$ $D^2$ will be moved outwardly, and as the collar E is depressed the inner edges will be moved inwardly. The motion of the collar is determined through the lever F by means of the link I, having at its lower end a screw-thread, K, upon which the worm-wheel M turns as a nut. This wheel M is turned by the screw L, which screw is itself turned by the pulley O when thrown in connection with the clutch P. The pulley O is driven from the pulley W on shaft S. W represents the overflow connected with the casing B.

The operation of our apparatus can now be readily understood. The collar E being raised, so that the pipes $D'$ $D^2$ project as far as possible, the liquid to be separated is allowed to fall into the basket. The basket by its revolution causes the deposit of the solid particles in a ring on the outside of said basket, the liquid overflowing through pipes $D'$ $D^2$. As this deposit continues the pipes $D'$ $D^2$ are continually drawn inward by the revolution of the nut M, turning on the screw-thread K, until the basket is filled up to its capacity. The deposited material may be removed in any suitable way.

What we claim as our invention, and desire to secure by Letters Patent, is—

1. The combination of a centrifugal basket with a tube or opening projecting through its periphery, said tube being made automatically movable from the periphery inward, substantially as described.

2. The combination of the basket C, tube D, bell-crank lever B', and adjusting-collar E, substantially as described.

JACOB W. DECASTRO.
TEILE HENRY MÜLLER.

Witnesses:
GEO. H. EVANS,
WM. A. POLLOCK.